United States Patent Office 2,740,656
Patented Apr. 3, 1956

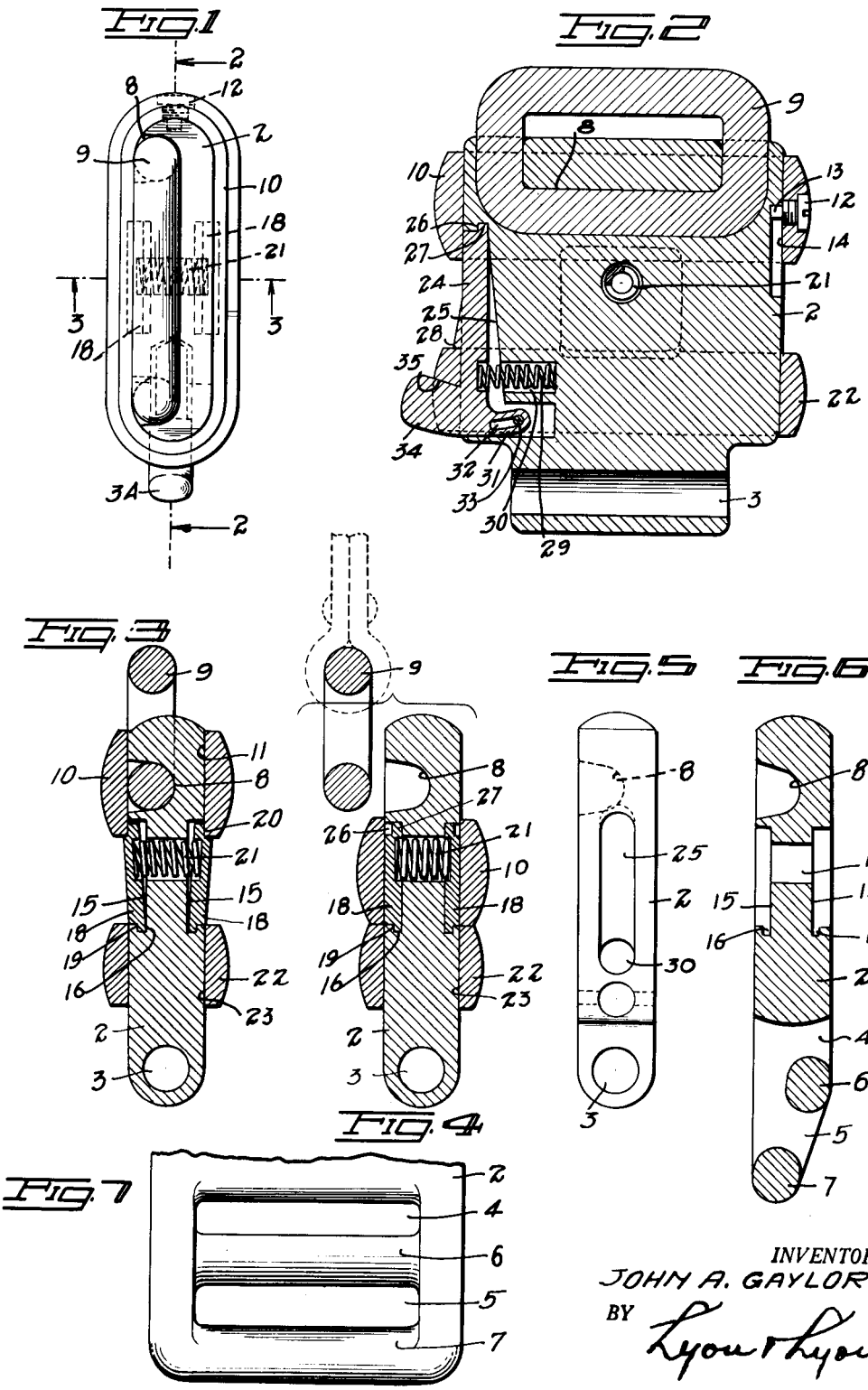

2,740,656

PARACHUTE RELEASE

John A. Gaylord, Pacific Palisades, Calif.

Application November 3, 1952, Serial No. 318,380

8 Claims. (Cl. 294—83)

This invention relates to a device for releasing a parachute harness and refers particularly to a parachute release so designed as to permit a ready release of the parachute harness by an operator through the use of one hand only while at the same time providing a release which is free without any possibility of accidental or unintentional operation.

On the descent of the parachute the wearer frequently finds it impossible with the present devices to sufficiently, quickly release the parachute harness and is in danger of becoming injured by being dragged by the parachute. There is, therefore, a substantial need of an improved type of parachute harness release which can be quickly operated, particularly one which can be operated by a single hand. It must also be appreciated that in the parachute descent the wearer is subjected to considerable tension and any release which can be actuated accidently in descent by any accidental clutching, grabbing or other substantially unconscious act of the wearer, or by any of the force occurring naturally in descent, is extremely dangerous. The requirement has, therefore, arisen for a parachute harness release which requires three movements to effect a release of the harness.

By the provision of a device requiring three separate movements the possibility of accidental release becomes substantially eliminated. These three movements must be all very simply performed, the load on the parachute should not impose any resistance to the free intended releasing movement, they should all be capable of being rapidly performed by one hand of the wearer, and should result in an insured positive release of the harness at the end of the movement.

It is a general object of the present invention therefore to provide a parachute release so constructed that it is protected against accidental release.

Another object of the present invention is to provide a parachute harness release in which the load on the parachute imposes no resistance to the actuation of the device to effect release.

Further objects of the invention are to provide a parachute release which may be operated by one hand in a single position yet necessitates a plurality of successive motions to effect release all capable of being performed in rapid succession by one hand of the operator.

In accordance with the present invention the parachute release comprises a body which is provided at one end with suitable means for attachment with the harness which is worn by the operator of the chute. The other end of the body is provided with a groove for receiving the parachute harness preferably by contact with the bail at the lower end of the harness. This groove is also preferably made for suitably tapering shaped walls so that any load on the bail in said groove will insure an instant separation of the bail and the body in the absence of some additional retaining means. The retaining means consists of a slitable member which is movable over the top of the groove to cause entrapment of the bail therein. There is a spring catch, or preferably a pair of mutually connected catch members, adapted to retain the holding member in position to restrain the bail in the groove. These catch members are adapted to simultaneously be actuated to the release in position by a further slidable release member which, to effect release, is slidable toward the holding member. There is also a catch or holding member for the release member actuated by pressure applied on a protruding element of the catch applied to the release member.

The catch of the present invention is so small in size that it may be substantially enclosed in one hand and readily operated by one hand. None of the load between the parachute wearer is in any way restrained by the actuation of the releasing mechanism, which may all be actuated by one hand. Three simple, successive operations, all capable of being performed within a time limit of a fraction of a second are required to effect release, these being, first, the pressure on the protruding knob of the catch for the sliding release member, second, a sliding movement of that release member on the sliding holding member, and third, the sliding of both members simultaneously to the release position.

The harness release of the present invention will be more fully understood from the following description of the preferred examples of the invention which are described in connection with the accompanying drawing in which Figure 1 is a top view of the release;

Figure 2 is a sectional elevation on the line 2—2 of Figure 1;

Figure 3 is a sectional elevation at right angles to Figure 2 on the line 3—3 of Figure 1;

Figure 4 is a sectional elevation similar to Figure 3 but with the device moved to the releasing position;

Figure 5 is a side view of the body;

Figure 6 is a side sectional elevation of a modified form of the body; and

Figure 7 is a fragmentary front elevation of the lower end of the body of Figure 6.

Referring first to Figures 1 to 5 of the drawings, the parachute harness release comprises first a body 2. This body 2 is preferably formed generally of a thick plate of metal so as to have one relative broad face as viewed in Figure 2, and one relatively narrow side as exhibited in Figures 3, 4 and 5. This form of the body is generally preferred because the harnesses as attached to the chute and then strapped to the wearer terminate in relatively broad fabric belts. At the lower end of the body there is provided means by which the body may be attached to the harness which is strapped to the wearer and in Figures 1 to 5 of the drawing for this purpose the body is shown as having the opening 3 which extends through the body in the direction of the thickness thereof for attachment with a suitable pin. In Figures 6 and 7 a modified formation of the lower end of the body is pivoted which is understood constitutes the sole differentiation between the device of Figures 6 and 7 and that of Figures 1 to 5. In Figures 6 and 7 the lower end of the body is shown as provided with two openings 4 and 5 which thereby form two supporting bars 6 and 7 staggered slightly relative to each other by means of which a strap in the wearer's harness may be attached to the body.

At the upper end of the body there is shown a groove 8 which extends inwardly from the side or broad face of the body and is shaped to generally receive the lower end of a bail 9 which is intended to be in turn strapped to the harness of the parachute. This opening therefore has, as shown in Figure 3, a horizontal portion connecting with two vertical sections and both the horizontal and vertical sections of the opening are preferably tapered to contract inwardly in order that the round side of the bail will freely roll with or move out of the opening 8 on any load between the parachute harness and the body unless additional means are provided to lock or hold the bail 9 in the groove 8.

To hold the bail 9 in the groove 8 there is provided a holding member 10 which is indicated as in the form of a rectangular sleeve having the flat inner surfaces 11 contacting loosely the loose running fit at the side faces of the body 2, the end walls of the rectangular groove being somewhat rounded to conform with the rounded side faces of the body 2. This holding member 10 is thus slidable vertically on the body and in the positions illustrated in Figures 1 to 3 operates as a positive closure for the groove 8, and in such position provides a means for positively holding the bail 9 to the body 2. To limit the escapement of the holding member 10 there is provided a set-screw 12 threaded into the member 10 and having an end 13 slidable in a short vertical groove 14 in the side wall of the body 2. There is provided two recesses 15 in the flat faces of the body, one on each side and aligned with each other, which recesses are preferably rectangular. These recesses at their lower end are provided with undercut portions 16 and there is an opening 17 through the body connecting the two recesses. These recesses receive catch members 18, which are in the form of substantially rectangular plates of a thickness corresponding to the depth of the recesses so that when fully inserted in the recesses their outer faces are in substantial alignment with the main portion of the flat side of the body 2. These catch members have grooves 19 along their lower edge to form extensions fitting in the undercut section of the recesses to restrain the catch members within the recesses. At their upper end they are also provided with recesses 20 which form a shoulder intended, as is shown in Figure 3, to engage the lower end of the holding member 10. Between the two catch members 18 there is provided the coil spring 21 which provides a yielding means urging the upper ends of the catch members outwardly, the catch members pivoting slightly about their lower ends. By the provision of two of the catch members it will be seen that any accidental contact with the side faces of the catch members 18 will not effect a disengagement of the holding member 10 unless the pressure is inwardly simultaneously on both catch members. No accidental blow can force the members inwardly simultaneously and thus release the holding member 10 so that it may be slid downwardly to release the bail 9.

In order to actuate the two mutually cooperating catch members 18 simultaneously to the releasing position there is provided a catch actuating member 22 which is likewise preferably in the form of a substantially rectangular sleeve having a sliding or running fit with the body and having the flat faces 23 for contact with the broad flat faces of the body 2. This member in the operating position of the harness release is normally disposed just below the recesses 15 receiving the catch members 18 and is adapted to be slid upwardly over the catch members 18 to force these against the spring 21 into the groove disengaging the shoulder 20 from the holding member 10. After this movement the holding member 10 may be slid downwardly pushing in front of it the member 22 into the position shown in Figure 4, whereupon the bail 9 is free to leave the groove 8, which it will readily do under any tension applied between the same and the body 2.

To prevent accidental movement of the catch actuating member 22 there is provided a further catch 24. For this purpose one of the narrow sides of the body is provided with a recess 25 having at its upper end the undercut portion 26 which acts to engage the shoulder 27 of the catch 24. Thus the upper end of the catch 24 acts as a pivot point for the catch. The catch is provided with a further shoulder 28 which engages the upper face of the member 22 when in the position indicated in Figure 2 to restrain that member from moving upwardly. The catch 24 is held with its lower position pivoted outwardly by the spring 29 having one end set in the recess 30 of the body. The lower end of the catch 24 has an inward extension 31 having an opening 32 for receiving a small pin 33 for retaining the catch 24 in the body. It is further provided with an operating extension or knob 34 which extends through the complementary recess 35 extending from the lower end of the member 22.

It will thus be seen that the parachute harness release of the present invention is in the form of a sturdy apparatus which may be readily constructed in a sufficiently small size to be entirely grasped within one hand. Preferably the major parts thereof are formed of aluminum or other light metal. In the device as illustrated, since all the parts are closely associated together within reach of one hand of the operator, almost an instantaneous release may be effected by the operator without any of its releasing actions in any way being opposed by the weight or tension of the parachute and device. The releasing action, although rapid and simple to perform, requires three movements. First a pressure on the knob 34 which occurs at a point in substantial alignment with the catch release 22, the fingers actuating the knob 34 in position to simultaneously engage the member 22 and on the pivoting of the release 24 inwardly slide that member up into contact with the holding member 10 where the fingers find immediately the holding member 10 which is then slid downwardly to the position shown in Figure 4, whereupon the bail 9 will rapidly pull itself out of the body, disconnecting the chute from the wearer.

I have, therefore, provided a simple, economical form of release for parachutes which provides no danger of accidental release and yet may be substantially easily operated by one hand of the operator.

The particular form of the device herein described is well adapted to carry out the objects of the invention and this invention is of the scope set forth in the appended claims.

I claim:

1. A parachute harness release comprising, a body having means at one end for attachment with a wearer's harness and a recess at the other end for receiving an element of a parachute harness, a holding member slidable on said body over said recess for entrapping said element therein, a pair of catch members mounted on opposite sides of said body and positioned within recesses in which they are adapted to be moved to permit said holding member to slide over said catches, said catches having a spring means for advancing the same to a position to restrain the movement of said holding member, and a second member mounted on said body movable against said catch members for forcing the same into the retracted position.

2. A parachute harness release comprising, a body having means at one end for attachment with a wearer's harness and a recess at the other end for receiving an element of a parachute harness, a holding member slidable on said body over said recess for entrapping said element therein, a pair of catch members mounted on opposite sides of said body and positioned within recesses in which they are adapted to be moved to permit said holding member to slide over said catches, said catches having a spring means for advancing the same to a position to restrain the movement of said holding member, a second member mounted on said body movable against said catch members for forcing the same into the retracted position, and a spring actuated catch for restraining the movement of the last mentioned moving member.

3. A parachute harness release comprising, a body having means at one end for attachment with a wearer's harness and a recess at the other end for receiving an element of a parachute harness, a holding member slidable on said body over said recess for entrapping said element therein, a pair of catch members mounted on opposite sides of said body and positioned within recesses in which they are adapted to be moved to permit said holding member to slide over said catches, said catches having a spring means for advancing the same to a position to restrain the movement of said holding member, and a second member mounted on said body movable against said catch members for forcing the same into the retracted position, the body having the form of a relatively flat plate and the recess in said body extending from one side of the body in a U-shape.

4. A parachute harness release comprising, a body having means at one end for attachment with a wearer's harness and a recess at the other end for receiving an element of a parachute harness, a holding member slidable on said body over said recess for entrapping said element therein, a pair of catch members mounted on opposite sides of said body and positioned within recesses in which they are adapted to be moved to permit said holding member to slide over said catches, said catches having a spring means for advancing the same to a position to restrain the movement of said holding member, a second member mounted on said body movable against said catch members for forcing the same into the retracted position, the body having the form of a relatively flat plate and the recess in said body extending from one side of the body in a U-shape, and a spring pressed catch for restraining the movements of the second slidable member.

5. A parachute release harness consisting of a body having two slidable members at one end of said body, the body having a side recess and receiving an element of a parachute harness over which one of said sliding members is adapted to move, there being a pair of spring pressed catch members on opposite sides of the body located in grooves in which said catch members are adapted to move to permit said sliding members to move on said body, said catches being normally disposed between the two sliding members when the recess is closed by the slidable member, said catch members being yieldingly movable outward to restrain the movement of the sliding member which covers said recess, the other sliding member being movable to retract said catch members.

6. A parachute release harness consisting of a body having two slidable members at one end of said body, the body having a side recess and receiving an element of a parachute harness over which one of said sliding members is adapted to move, there being a pair of spring pressed catch members on opposite sides of the body located in grooves in which said catch members are adapted to move to permit said sliding members to move on said body, said catches being normally disposed between the two sliding members when the recess is closed by the slidable member, said catch members being yieldingly movable outward to restrain the movement of the sliding member which covers said recess, the other sliding member being movable to retract said catch members, a second recess in said body and a further spring pressed catch member mounted in said latter recess of said body and normally urged outward to restrain the movement of the other movable member and retractable to permit its movement.

7. A parachute harness release which is adapted to be operated by the hand of an operator in a single position and necessitates three successive motions in releasing operation, said release comprising, a body in the form of a relatively flat plate having means at one end for attachment to a wearer's harness and having a recess at the other end for receiving an element of a parachute harness, two sliding members mounted on said body, one movable over said recess, a pair of catch members mounted in recesses on opposite sides of said body and located between these sliding members when the recess is closed by the slidable member, said catch members being movable into the recesses to permit both sliding members to pass thereover, said catches being spring actuated to a position to restrain the movement of the sliding member which closes said recess, the second sliding member being movable to move the catch member to retarded position, and a spring catch restraining the movement of the second sliding member whereby three successive motions of an operator's arm in one position will effect opening of the release comprising first the release of the spring pressed catch from the second sliding member, second, the sliding movement of that member into contact with the other member, and finally a sliding movement of both members together to uncover said recess.

8. A parachute harness release comprising, a body having means at one end for attachment with the wearer's harness, and a recess at the other end for receiving an element of the parachute harness, a holding member slidable on said body over said recess for entrapping said element therein, the body having a further recess, a spring-actuated catch member mounted in said further recess and movable to and from an advanced position where it restrains the movement of said holding member, a second member slidably mounted on said body and slidable to and from a position for retraction of said spring-actuated catch member, and a spring-actuated catch for restraining the movement of the last mentioned moving member.

References Cited in the file of this patent

UNITED STATES PATENTS

| | | |
|---|---|---|
| 2,393,072 | Skinner | Jan. 15, 1946 |
| 2,461,024 | Baumgardner | Feb. 8, 1949 |